US011234142B2

(12) United States Patent
Polacheck

(10) Patent No.: US 11,234,142 B2
(45) Date of Patent: Jan. 25, 2022

(54) SYSTEM AND METHOD FOR SINGLE-CHANNEL ARCHITECTURE FOR IMMEDIATE ACCESS POINT REDUNDANCY

(71) Applicants: Allied Telesis Holdings Kabushiki Kaisha, Tokyo (JP); Allied Telesis Holdings K.K., Tokyo (JP); Allied Telesis, Inc., Bothell, WA (US)

(72) Inventor: Shuval Polacheck, Shefayim (IL)

(73) Assignees: ALLIED TELESIS HOLDINGS KABUSHIKI KAISHA, Tokyo (JP); ALLIED TELESIS HOLDINGS K.K., Tokyo (JP); ALLIED TELESIS, INC., Bothell, WA (US)

( * ) Notice: Subject to any disclaimer, the term of this patent is extended or adjusted under 35 U.S.C. 154(b) by 0 days.

(21) Appl. No.: 16/744,972

(22) Filed: Jan. 16, 2020

(65) Prior Publication Data
US 2021/0227406 A1 Jul. 22, 2021

(51) Int. Cl.
*H04W 24/04* (2009.01)
*H04L 12/24* (2006.01)
*H04W 84/12* (2009.01)

(52) U.S. Cl.
CPC ......... *H04W 24/04* (2013.01); *H04L 41/0654* (2013.01); *H04W 84/12* (2013.01)

(58) Field of Classification Search
CPC ..... H04W 24/04; H04W 84/12; H04W 48/16; H04L 41/0654
See application file for complete search history.

(56) References Cited

U.S. PATENT DOCUMENTS

| | | | |
|---|---|---|---|
| 6,594,776 B1 * | 7/2003 | Karighattam | H04B 1/74 370/386 |
| 7,536,464 B1 * | 5/2009 | Dommety | H04W 12/06 709/225 |
| 8,694,674 B2 * | 4/2014 | James | H04L 45/10 709/238 |
| 9,667,497 B2 * | 5/2017 | Petrick | H04L 41/0893 |
| 9,992,039 B2 * | 6/2018 | Anandan | H04L 45/22 |
| 10,863,267 B2 * | 12/2020 | Silva | H04R 3/00 |
| 2019/0310926 A1 * | 10/2019 | Hashimoto | G06F 11/1471 |

* cited by examiner

*Primary Examiner* — Chandrahas B Patel
(74) *Attorney, Agent, or Firm* — Concept IP LLP; Michael Zarrabian

(57) ABSTRACT

Systems, devices, and methods for two or more access points (APs), where each AP comprises: at least one LAN port for connection to the wired network; at least one LAN port for connection between at least one other AP; a processor having addressable memory, where the processor of a first AP of the two or more APs is configured to: select the first AP of the two or more APs as a primary AP; select the second AP of the two or more APs as a back-up AP; detect, via a trigger, a failure of the primary AP; and configure the second AP as the primary AP and the first AP as the back-up AP if the failure of the first AP is detected.

12 Claims, 17 Drawing Sheets

Option 1

SYSTEM AND METHOD FOR SINGLE-CHANNEL ARCHITECTURE FOR IMMEDIATE ACCESS POINT REDUNDANCY

TECHNICAL FIELD

Embodiments relate generally to wireless networks, and more particularly to single-channel architecture for immediate access point redundancy.

BACKGROUND

Single-channel architecture (SCA) utilizes multiple access points (APs) that each identify themselves with the same basic service set identifier (BSSID), such as a media access control (MAC) address. The APs may be managed by a centralized Wireless LAN controller (WLC) that coordinates the APs such that APs do not interfere with one another. A client connected to a SCA network may only see a single AP even though two or more APs may be present.

SUMMARY

A system embodiment may include: two or more access points (APs), where each AP may include: at least one LAN port for connection to the wired network; at least one LAN port for connection between at least one other AP; a processor having addressable memory, where the processor of a first AP of the two or more APs may be in communication with the processor of a second AP of the two or more APs over a hot sync cable, and where the processor of the first AP may be configured to: select the first AP of the two or more APs as a primary AP; select the second AP of the two or more APs as a back-up AP; detect, via a trigger, a failure of the primary AP; and configure the second AP as the primary AP and the first AP as the back-up AP if the failure of the first AP is detected.

In additional system embodiments, each of the two or more APs may be tuned to the same radio frequency (RF) channel or frequency. In additional system embodiments, each of the two or more APs may provide wireless connections to one or more user devices. In additional system embodiments, the connection to the local network may be via an Ethernet cable.

In additional system embodiments, the detected failure of the primary AP may include a failure of the Ethernet cable between the primary AP and the backup AP. In additional system embodiments, the connection between the APs may be via the hot sync cable. In additional system embodiments, the hot sync cable may be an Ethernet cable. In additional system embodiments, the connection between the APs may be wireless.

Additional system embodiments may further include: a hub in communication with each of the two or more APs via each of the at least one LAN ports for Ethernet connection to the local network, where the hub may be directly connected to the local network. In additional system embodiments, the hub may be directly connected to the local network via a single cable. In additional system embodiments, the at least one LAN port for connection between at least one other AP may be a general-purpose input/output (GPIO) port. In additional system embodiments, the back-up AP receives frames, and the back-up AP does not transmit frames.

A method embodiment may include: monitoring, by a first access point (AP), a status of a second AP, where the first AP may be a back-up AP, and where the second AP may be a primary AP; detecting, by the first AP, the monitored status of the second AP as a failure; converting, by the first AP, the first AP into the primary AP, where the second AP may be converted into the back-up AP.

In additional method embodiments, the detected failure may be via a lack of link power over a hot sync cable connected between at least one LAN port of the first AP and at least one LAN port of the second AP. In additional method embodiments, the detected failure may be at least one of: a signal transmitted via a hot sync link by the second AP to the first AP and an acknowledgment signal transmitted by the first AP to the second AP, and a lack of wireless activity by the primary AP. Additional method embodiments may include: transmitting, by the first AP, at least one frame to the second AP after failure of the first AP, to declare the failure.

Another system embodiment may include: a first access point (AP) of two or more access points (APs), where the first AP comprises: at least one LAN port for connection to a local network; at least one LAN port for connection between at least one other AP via a hot sync cable; a processor having addressable memory, the processor configured to: select the first AP of the two or more APs as a primary AP; detect a failure of the first AP; send a signal via the hot sync cable based on the detected failure; configure the first AP of the two or more APs as a back-up AP; a second (AP) of two or more access points (APs), where the second AP comprises: at least one LAN port for connection to the local network; at least one LAN port for connection between at least one other AP via the hot sync cable; a processor having addressable memory, the processor configured to: select the second AP of the two or more APs as a back-up AP; receive a signal from the first AP based on the detected failure; configure the second AP of the two or more APs as a primary AP.

Additional system embodiments may include: a hub in communication with each of the two or more APs via each of the at least one LAN ports for Ethernet connection to the local network, where the hub may be directly connected to the local network. In additional system embodiments, the hub may be directly connected to the local network via a single cable. In additional system embodiments, the back-up AP receives frames, and the back-up AP does not transmit frames.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
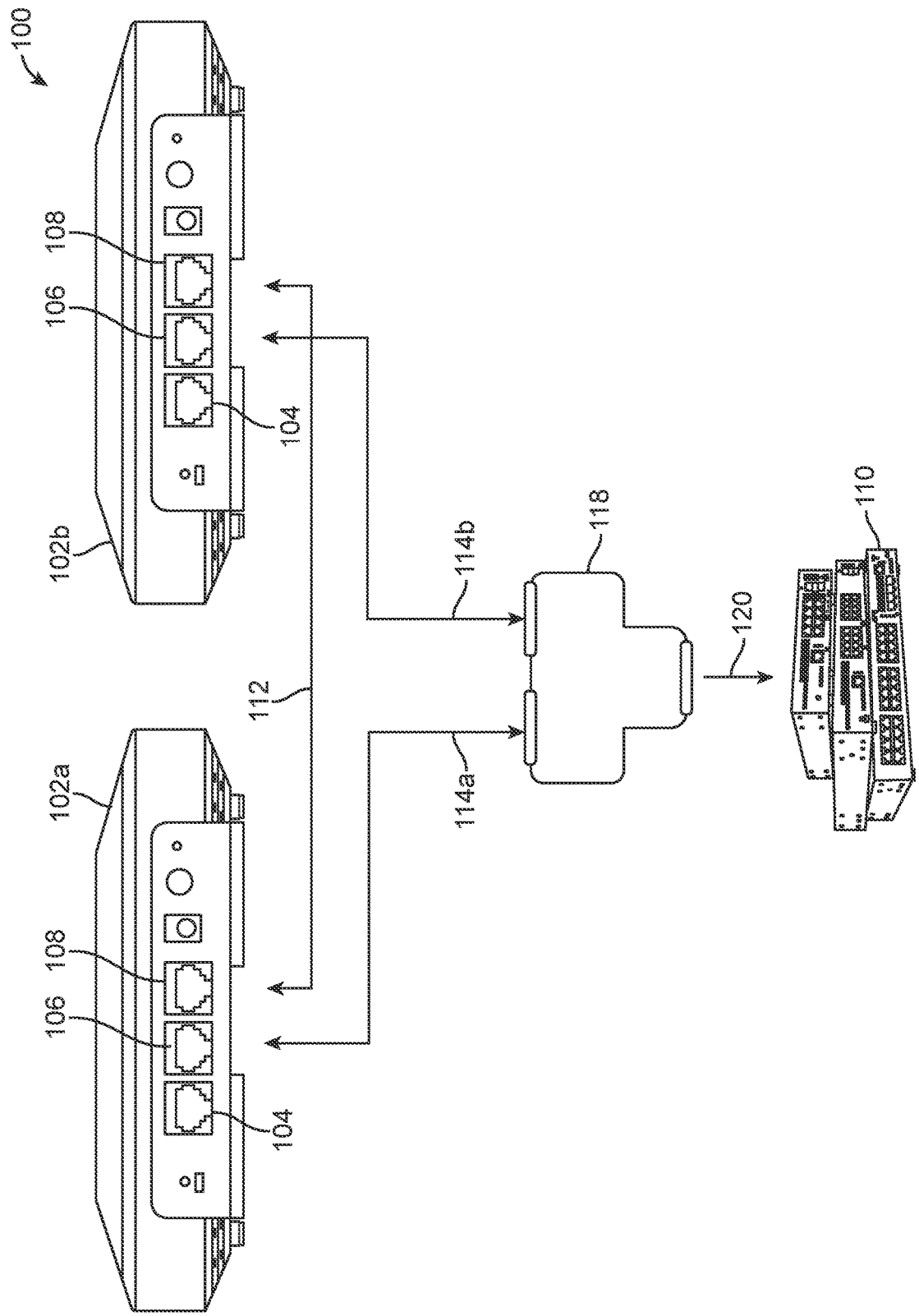
FIG. 1 is a schematic illustration of a system for single-channel architecture for immediate access point redundancy.

With respect to FIG. 1, a system 100 for single-channel architecture (SCA) for immediate access point redundancy is illustrated. Generally speaking, SCA networks include access points that may be all tuned to the same radio frequency (RF) channel or frequency. The SCA network may be designed so that clients cannot distinguish between the access points providing coverage: instead the SCA network decides which access point should transmit and receive data for a particular client; therefore, the client is not involved in a handover decision. System 100 provides for failure detection of a first access point 102*a* and immediate handover to a redundant, second access point 102*b*. Access points 102*a,b* may connect directly to a wired local area network (WLAN), typically Ethernet, and the access points 102*a,b* may provide wireless connections via WLAN technology, such as Wi-Fi.

In one embodiment, the access points 102*a,b* may each include three ports. In another embodiment the access points 102*a,b* may include more or less than three ports. A first port of each access point 102*a,b* is a console port 104 and the remaining two ports of each access point 102*a,b* are local area network (LAN) ports providing a wired connection to a network. More specifically, a first LAN port 106 connects each access point 102*a,b* to wired network 110 which may include devices such as controller with a first cable 114*a* connected to the first access point 102*a* and a second cable 114*b* connected to the second access point 102*b*. In one embodiment, the cables 114*a,b* are Ethernet cables.

In one embodiment, both cables 114*a,b* to may connect directly to a splitter 118. The splitter 118 allows for putting both access points 102*a,b* over one single cable 120, the single cable 120 then connecting directly to local network 110. In one embodiment, the splitter 118 may be an RJ45 splitter, Ethernet hub, or similar hardware in which a signal introduced at the input of any port appears at the output of all the other ports.

A second LAN port 108 provides a direct wired connection with an Ethernet cable used as hot sync cable 112 between the two access points 102*a,b* to create a hot sync channel configured for the SCA. With the hot sync connection, one of the access points may be used as the primary access point and the other access point will be used as a redundant, hot back-up access point in the case of failure or malfunction of the primary access point 102*a*. In one embodiment, the second LAN port 108 may be a general-purpose input/output (GPIO) port. In another embodiment, the second LAN port 108 may be a GPIO port. In one embodiment, the hot sync may be performed wirelessly.

Figure 2:
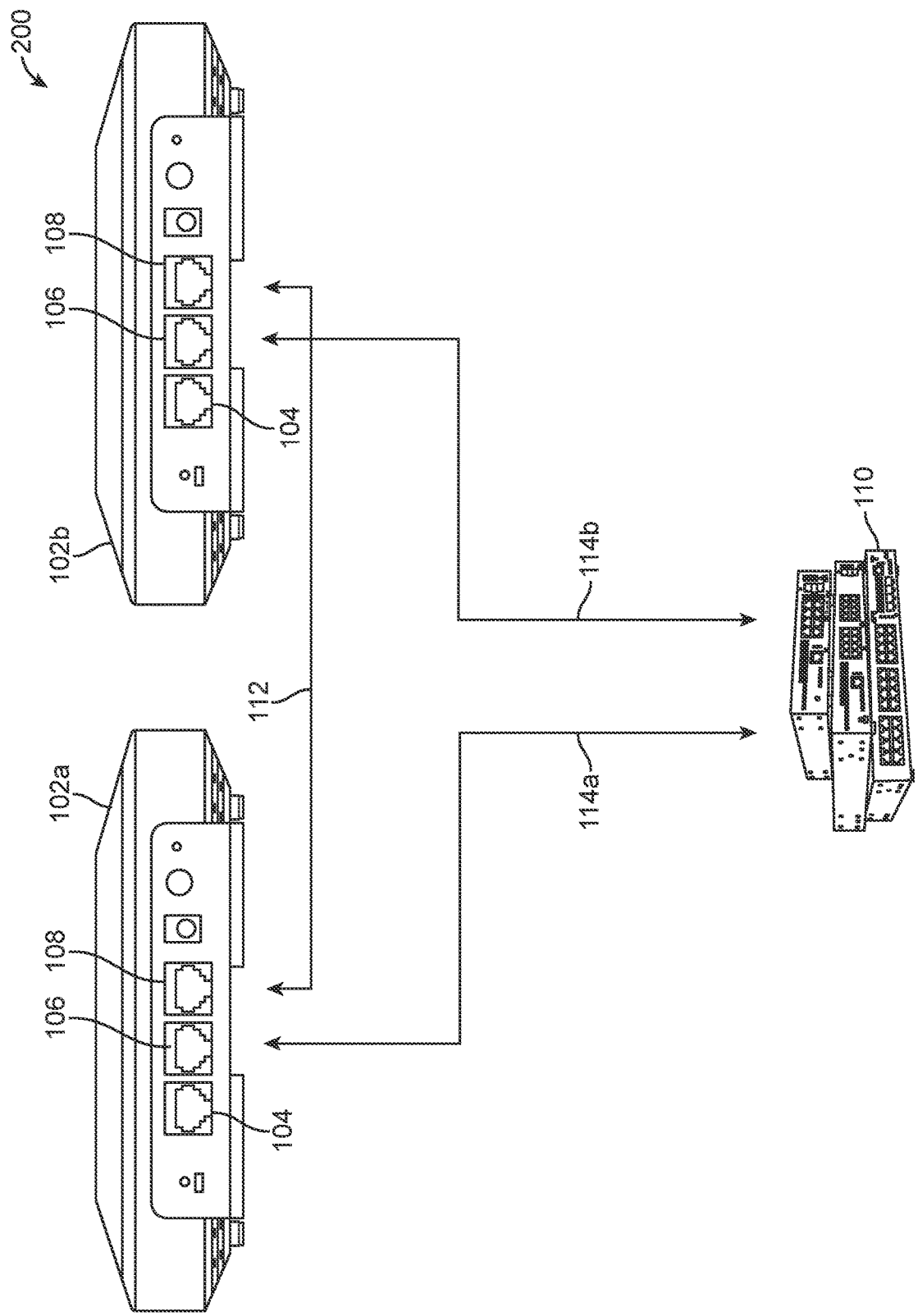
FIG. 2 is a schematic illustration of an alternative system for single-channel architecture for immediate access point redundancy.
Figure 3:
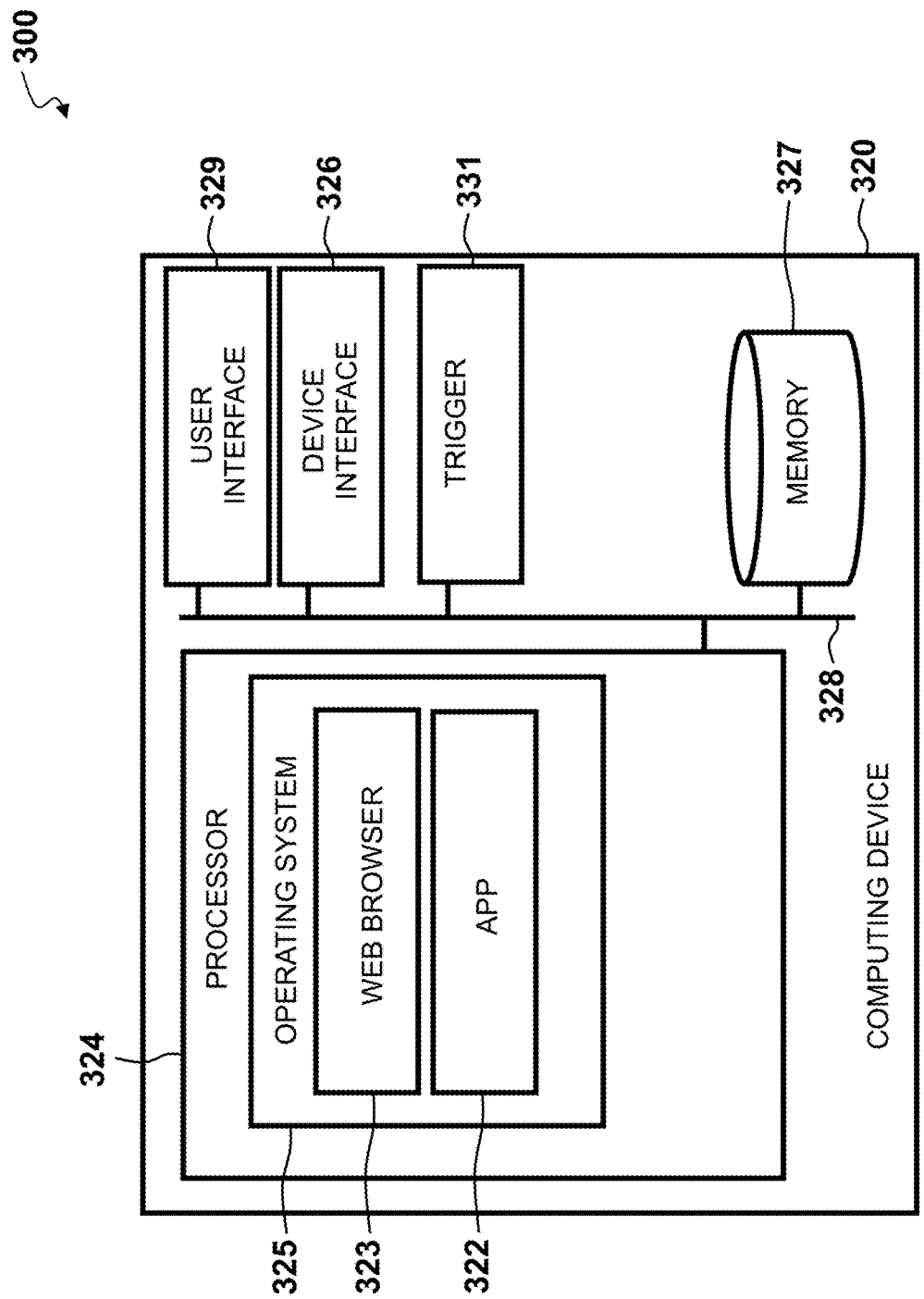
FIG. 3 illustrates an example top-level functional block diagram of a computing device embodiment.

FIG. 3 illustrates an example of a top-level functional block diagram of a computing device embodiment 300. The example operating environment is shown as a computing device 320 associated with the access points 102*a,b* of FIGS. 1 and 2 comprising a processor 324, such as a central processing unit (CPU), addressable memory 327, an external device interface 326, e.g., an optional universal serial bus port and related processing, and/or an Ethernet port and related processing, and an optional user interface 329, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 328. In some embodiments, via an operating system 325 such as one supporting a web browser 323 and applications 322, the processor 324 may be configured to execute steps of a process establishing a communication channel and processing according to the embodiments described above. In some embodiments, a trigger 331 may detect a malfunction or damage to the either access point 102*a,b*. Both access point 102*a,b* may be configured to be integrated with the computing device 320.

In operation, and with respect to FIG. 1, when the access points 102*a,b* boot up from the start, the hot sync selects one to be the primary access point (e.g., access point 102*a*) and one to be the redundant, backup access point (e.g., access point 102*b*). In one embodiment, the processor 324 executes steps to run the application 322 to determine which access point will be the primary access point and which access point will be the redundant, backup access point. In one embodiment, both access points 102*a,b* are identical with one functioning as the primary and the other as the redundant backup, and the two access point 102*a,b* simply sync between one another. The primary access point will function normally, with the processor 324 executing steps to run the application 322 for transmitting frames either wirelessly or over the cables 114*a,b*. Meanwhile, the backup access point will remain silent. The backup access point may still receive frames over the air and over the hot sync cable 112; however, the backup access point cannot transmit frames.

In one embodiment, the hot sync cable 112 provides the primary access point the latest image of the stations connected to the backup access point. That way, if the backup access point needs to take over in the case of a malfunction or damage to the primary access point, the most recent data is available to the backup access point and a user may still experience that the network is continuing to operate normally.

In the event of a malfunction or damage to the primary access point, the trigger 331 may detect a failure either over the cables 114*a,b* and/or cable 120 or over the wireless radio. The trigger 331 may then interrupt the application 322, and the processor 324 of the main access point may execute steps to transmit a signal over the hot sync cable 112 to the backup access point, where the signal may be a command for backup access point to now become the primary access point. At this point, the malfunctioning or damaged primary access point will automatically begin to function as the backup access point and the processor 324 may cause the now backup access point to reset. Furthermore, the now backup access point may detect that a new primary access point exists and the processor 324 may execute steps to cause the now backup access point to no longer function as the primary access point. Functioning now as the back access point, the processing power of the processor 324 may be substantially dedicated to monitoring the now primary access point and waiting for the trigger 331 to trigger an event.

The hot sync connection provides for a redundant access point system. For example, if access point 102a is the primary access point, then identical access point 102b will be the backup access point and will monitor the primary access point 102a. If the trigger 331 detects a malfunction or failure associated with the primary access point 102b, then the backup access point 102b will automatically become the new primary access point, and the access point 102a will automatically become the backup access point. The access point redundancy means the system 100 may nearly instantaneously handover control from one access point to another access point in order to continuously operate without the need for human interaction. In one embodiment, a third device external to the access points (such as an external controller) may be used to detect a failure or malfunction of one of the access points and to convert the redundant back up access point to the primary access point and vice versa.

With respect to FIG. 2, an alternative system 200 for single-channel architecture (SCA) for immediate access point redundancy is illustrated. Many of the same reference elements of FIG. 1 are retained throughout for clarity. In this embodiment, both cables 114a,b may connect directly the local network 110. Generally speaking, system 200 performs in the same manner as system 100 of FIG. 1; however, the splitter 118 of FIG. 1 is not included in system 200. In one embodiment, if one of the cables 114a,b fails (e.g., is torn, becomes damaged, etc.), the access point associated with the other cable will be the primary access point. For example, if access point 102a is the primary access point and cable 114a fails, then trigger 331 triggers the redundant backup access point 102b to become the primary access point and access point 102b communicates with devices in local network over cable 114b. If on the other hand the access point 102a was already the backup access point before damage to the cable 114a occurred, then access point 102b would simply continue functioning as the primary access point.

Figure 4:
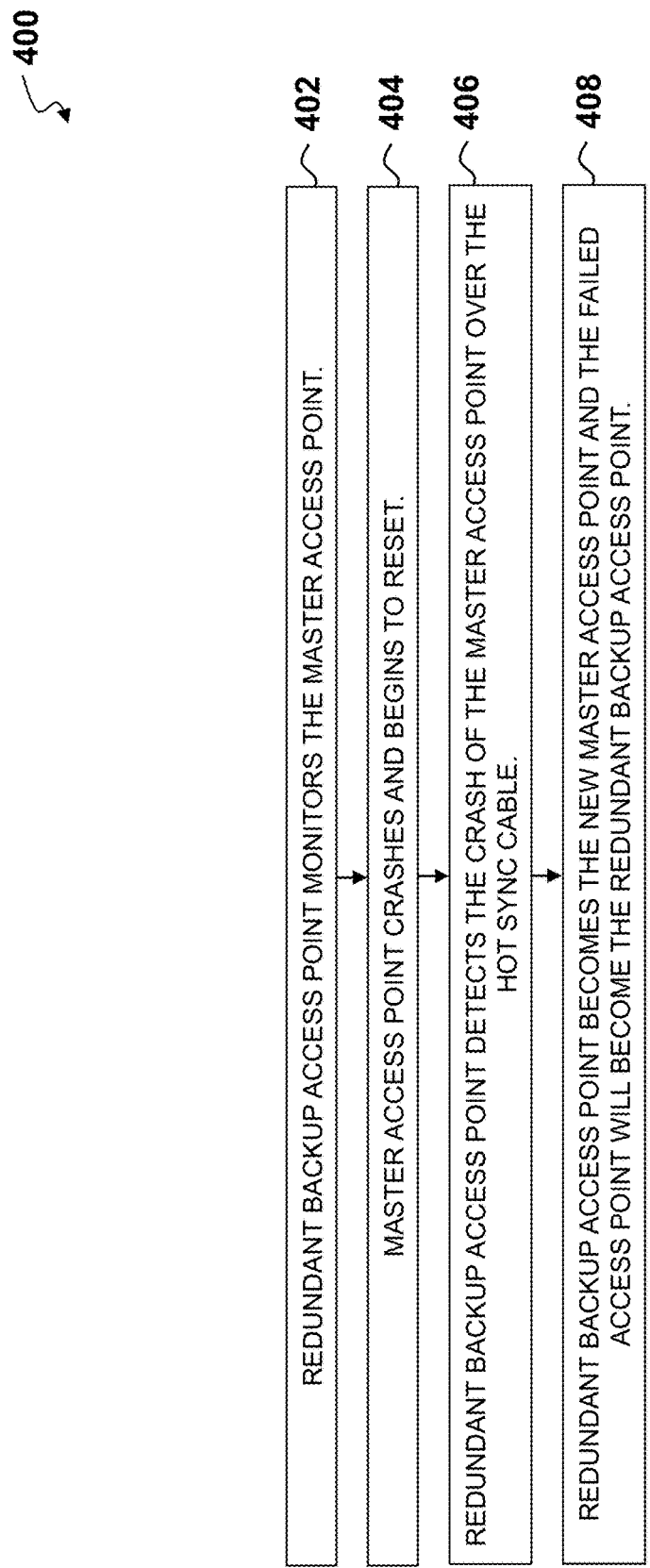
FIG. 4 is a flow chart for a failure detection method of a system for single-channel architecture for immediate access point redundancy.

With respect to FIG. 4, a method 400 for failure detection is illustrated. At step 402 the redundant backup access point is monitoring the primary access point. At step 404, the primary access point crashes and begins to reset. At step 406, the redundant backup access point detects the crash of the primary access point over the hot sync cable. At step 408, the redundant backup access point becomes the new primary access point and the failed access point will become the redundant backup access point once the failure has been resolved.

Figure 5:
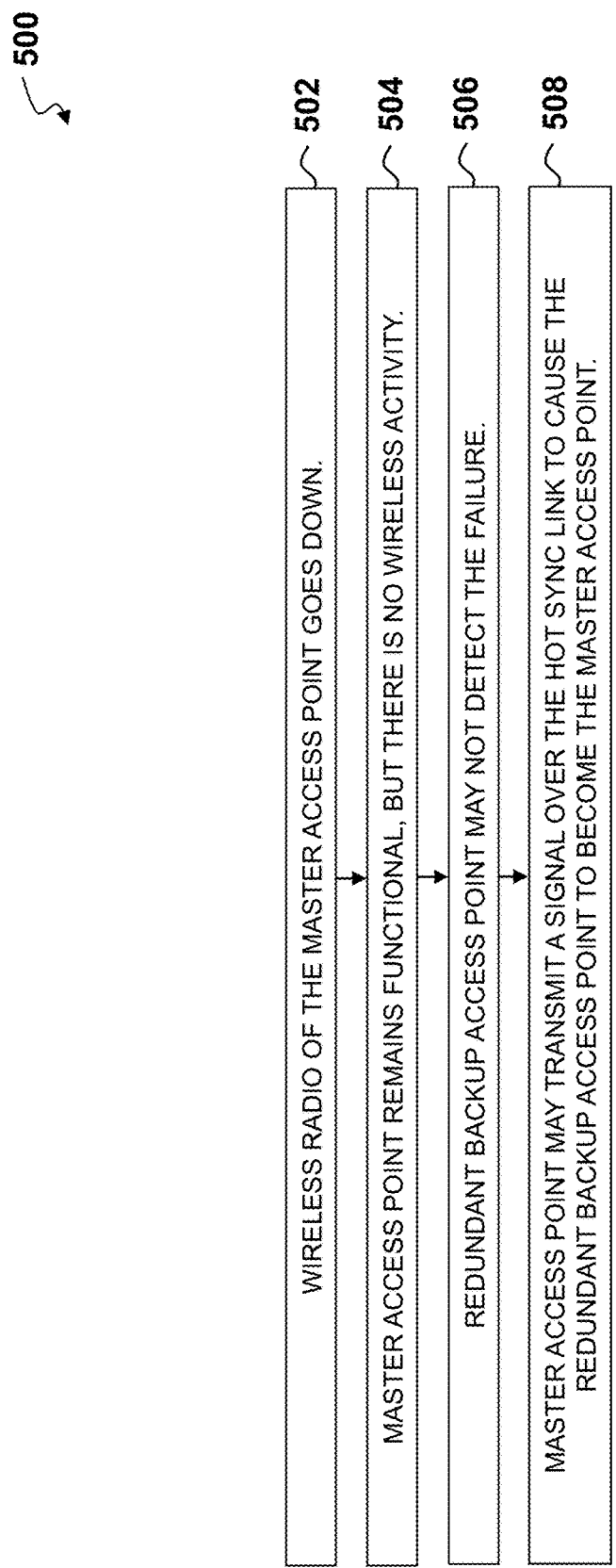
FIG. 5 is a flow chart for an alternative failure detection method of a system for single-channel architecture for immediate access point redundancy.

With respect to FIG. 5, an alternative method 500 for failure detection is illustrated. At step 502, the wireless radio of the primary access point goes down. At step 504, the primary access point is still functional, but there is no wireless activity. At step 506, the redundant backup access point may not detect a failure in this instance; however, at step 508, the primary access point may transmit a signal over the hot sync link to cause the redundant backup access point to become the primary access point.

Figure 6:
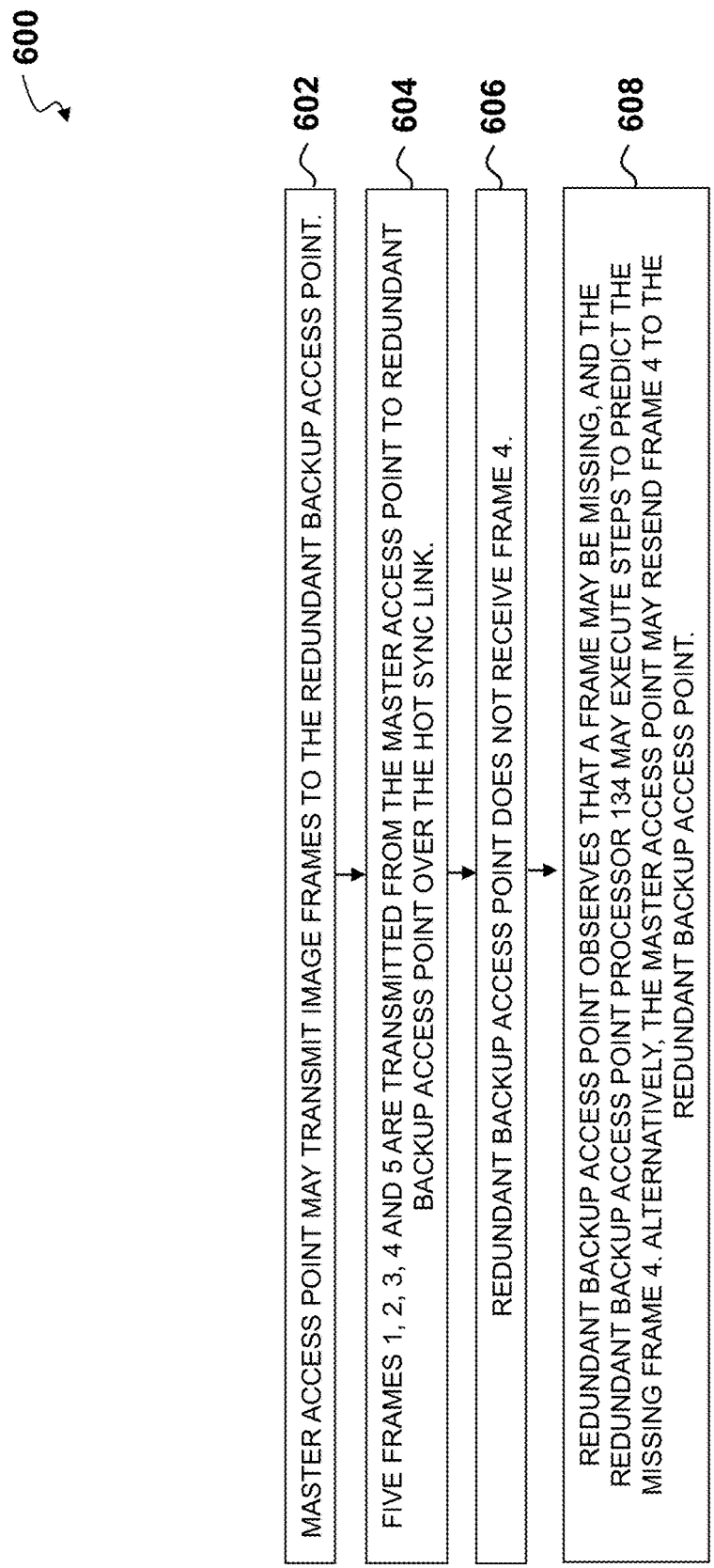
FIG. 6 is a flow chart of a method for handling data loss due to an access point failure.

With respect to FIG. 6, an example method 600 for handling data loss due to an access point crash is illustrated. At step 602, a primary access point may transmit image frames to the redundant backup access point. In one embodiment, and at step 604, five frames 1, 2, 3, 4 and 5 are transmitted from the primary access point to redundant backup access point over the hot sync link. At step 606, the redundant backup access point does not receive frame 4. At step 608, the redundant backup access point observes that a frame may be missing, and the redundant backup access point processor 134 may execute steps to predict the missing frame 4. Alternatively, the primary access point may resend frame 4 to the redundant backup access point.

Figure 7:
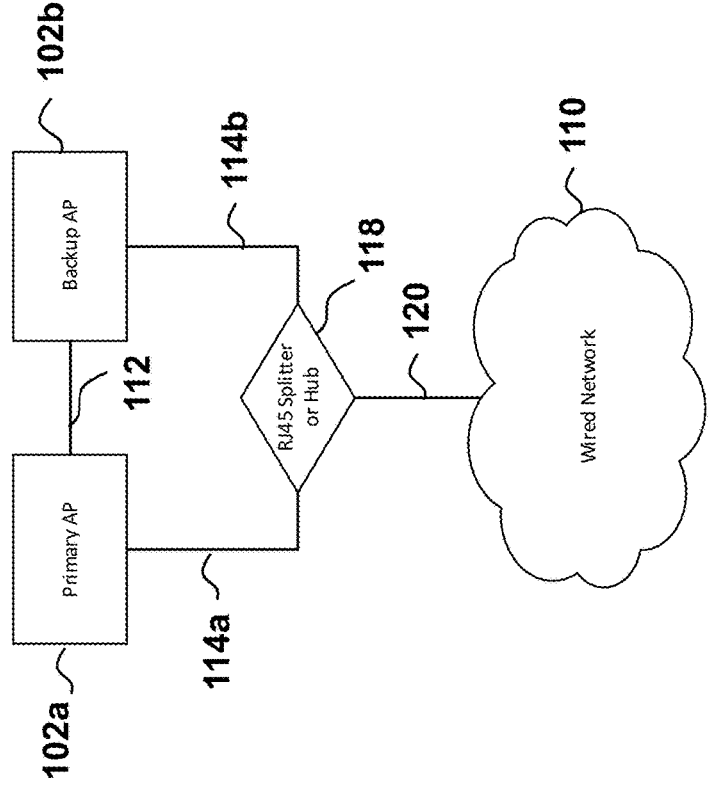
FIG. 7 is a schematic of the system of FIG. 1.

With respect to FIG. 7, a schematic of system 100 for SCA redundancy is shown as a first option ("Option 1"). As described above, system 100 provides for failure detection of the first access point 102a and immediate handover to the redundant, second access point 102b. Access points 102a,b may connect directly to a wired local area network (WLAN), typically Ethernet, and the access points 102a,b may provide wireless connections via WLAN technology, such as Wi-Fi.

In one embodiment, a LAN port (such as first LAN port 106 of FIG. 1) connects each access point 102a,b to wired network 110 with the first cable 114a connected to the first access point 102a and the second cable 114b connected to the second access point 102b. In one embodiment, the cables 114a,b are Ethernet cables.

In one embodiment, both cables 114a,b to may connect directly to the splitter 118. The splitter 118 allows for putting both access points 102a,b over one single cable 120, the single cable 120 then connecting directly to the local network 110.

Figure 8:
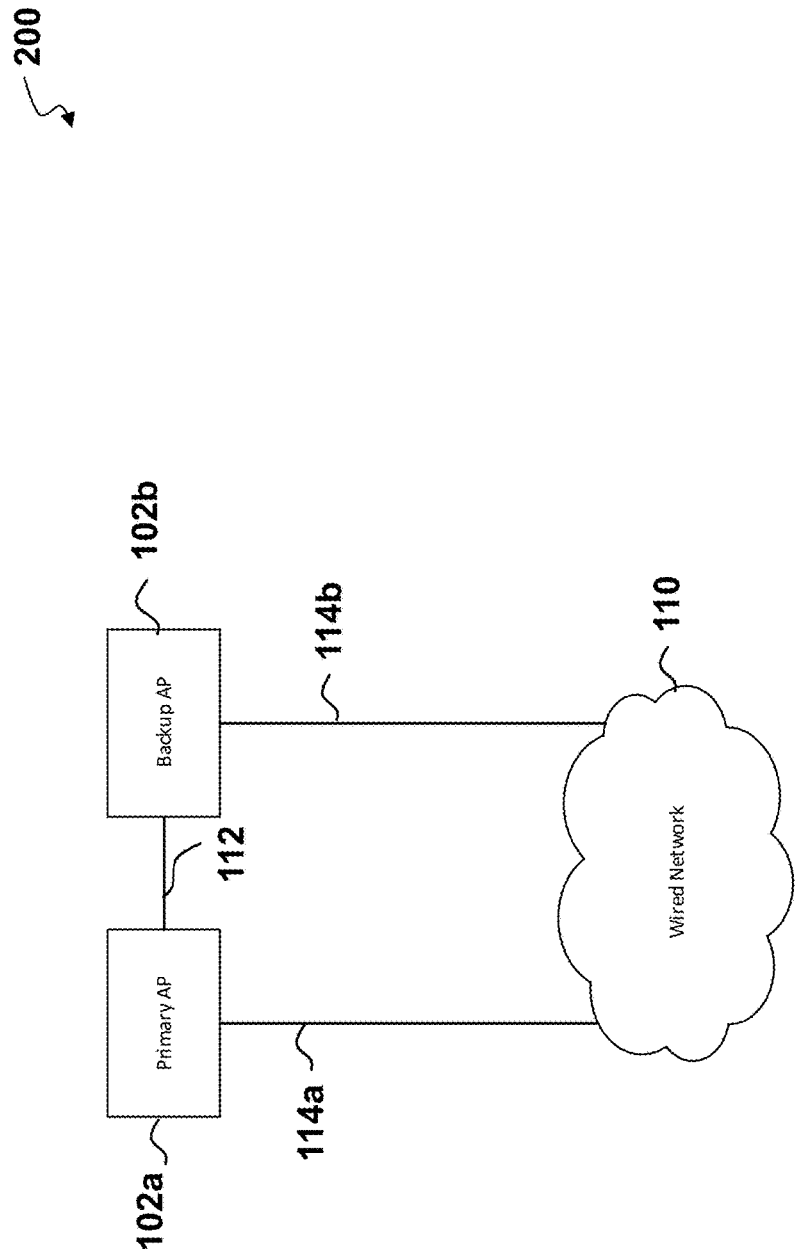
FIG. 8 is a schematic of the system of FIG. 2.

With respect to FIG. 8, a schematic of the alternative system 200 for SCA redundancy is illustrated is shown as a second option ("Option 2"). Many of the same reference elements of FIG. 2 (and, hence, FIGS. 1 and 7) are retained throughout for clarity. In this embodiment, both cables 114a,b may connect directly the local network 110. Generally speaking, system 200 performs in the same manner as system 100 of FIG. 1; however, the splitter 118 of FIG. 1 is not included in system 200.

Figure 9:
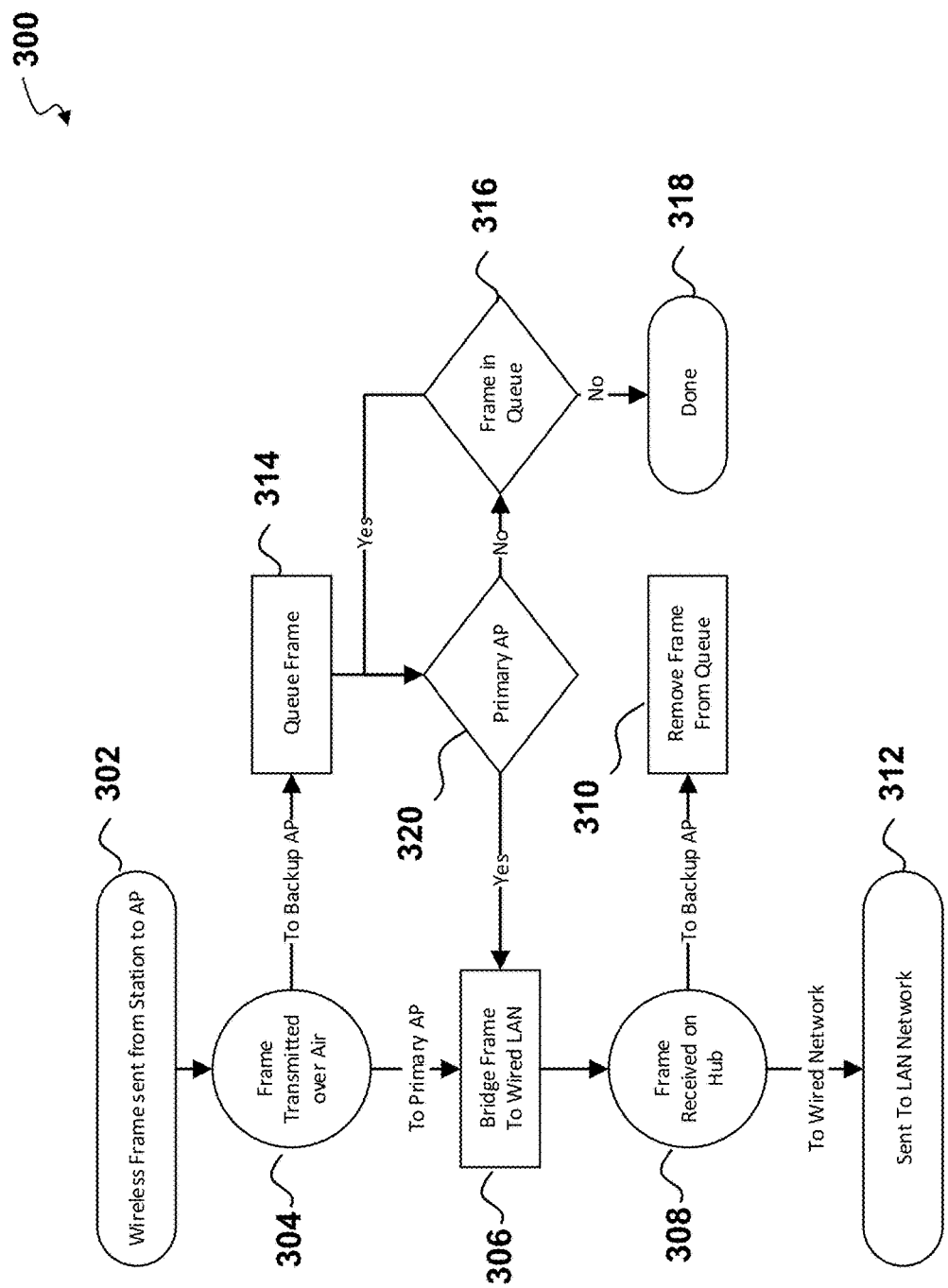
FIG. 9 a flowchart of a flow of data associated with the system of FIGS. 1 and 7.

With respect to FIG. 9, a flowchart 300 of the flow of data for Option 1 of FIG. 7 is illustrated. At step 302, a wireless frame is sent to an access point, such as access point 102a,b from a station. At step 304, the frame is sent over the air and may be received simultaneously in both a primary access point at step 306 as well as a backup access point at step 314. At step 314, the frame will be introduced in the backup access point, such as access point 102b, and will be stored in the backup access point's memory. At step 306, the same frame is received at the primary access point, such as access point 102a, and the frame is bridged to a wired LAN. At step 308, the frame is received on a hub which will send the frame to both the backup access point and a wired network. When the frame is received at the backup, secondary access point, such as access point 102b, then the matching frame that was stored at step 314 is removed from the queue (step 310). At the same time, an identical frame received at the hub is sent to the wired network, and then at step 312 the frame is sent to the LAN network.

After step 314, the backup, secondary access point 102b will check, at step 320, if the backup, secondary access point 102b has become a primary access point due to a failure detection at the original primary access point 102a. If access point 102b has become the primary access point, then the access point 102b will bridge the frame in step 306 and continue in the previously described data flow. If access point 102b has not become the primary access point, the backup access point 102b will keep checking if there are pending frames in the memory (step 316) and will return to step 320 if a pending frame exist. If no frames are waiting in the memory, then the backup process will be completed until the next frame (step 318).

Figure 10:
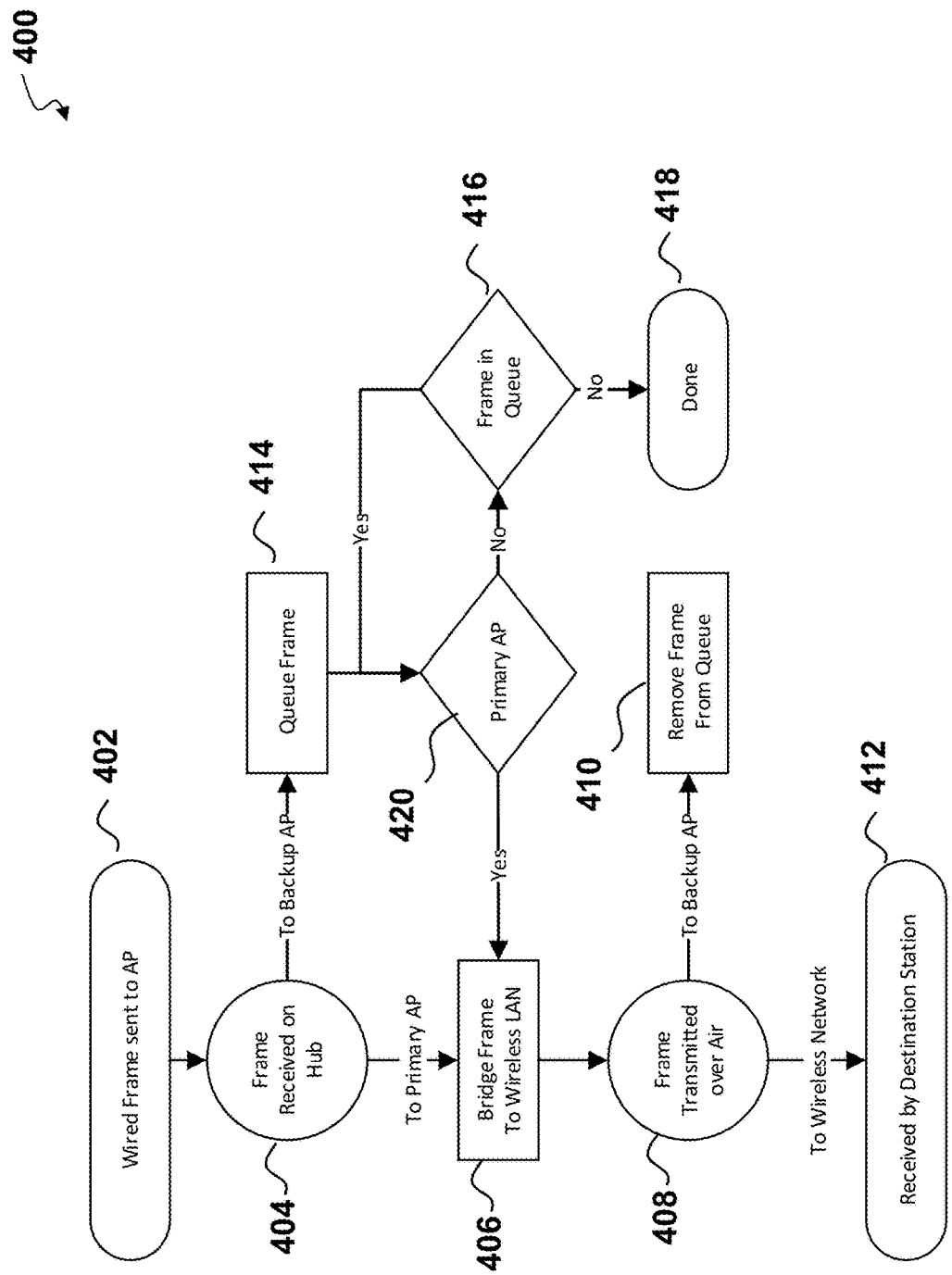
FIG. 10 a flowchart of an alternative flow of data associated with the system of FIGS. 1 and 7.

With respect to FIG. 10, a flowchart 400 of the flow of data for Option 1 of FIG. 7 is illustrated. At step 402, a wired frame is sent to an access point, such as access point 102a,b from a station. At step 404, the frame is received at a hub which will send identical copies of the frame to both primary and backup, secondary access points. At step 414, the frame will be introduced in the backup access point, such as backup access point 102b, and will be stored in the backup access point's 102b memory. At step 406, the frame is received at the first, primary access point, such as access point 102a, and the frame is bridged to a wireless LAN. At step 408, the frame is transmitted over air where the backup access point 102b can pick up the signal and receive the frame as well as destination wireless stations. When the frame is received in the backup, secondary access point, such as access point 102b, then the matching frame that was queued in step 414 is removed from the queue (step 410). At the same time, the same frame will be received at the destination wireless stations (step 412).

After step 414, the backup, secondary access point 102b, will check in step 420 if it has become a primary access point due to failure detection at original primary access point 102a. If yes, then it will bridge the frame in step 406 and continue in pervious described data flow. If no, the backup access point will keep checking if there are pending frames in the memory (step 416) and go back to 420 if pending frame exist. If no frames are waiting in the memory, then the backup process will be completed until the next frame (step 418).

Figure 11:
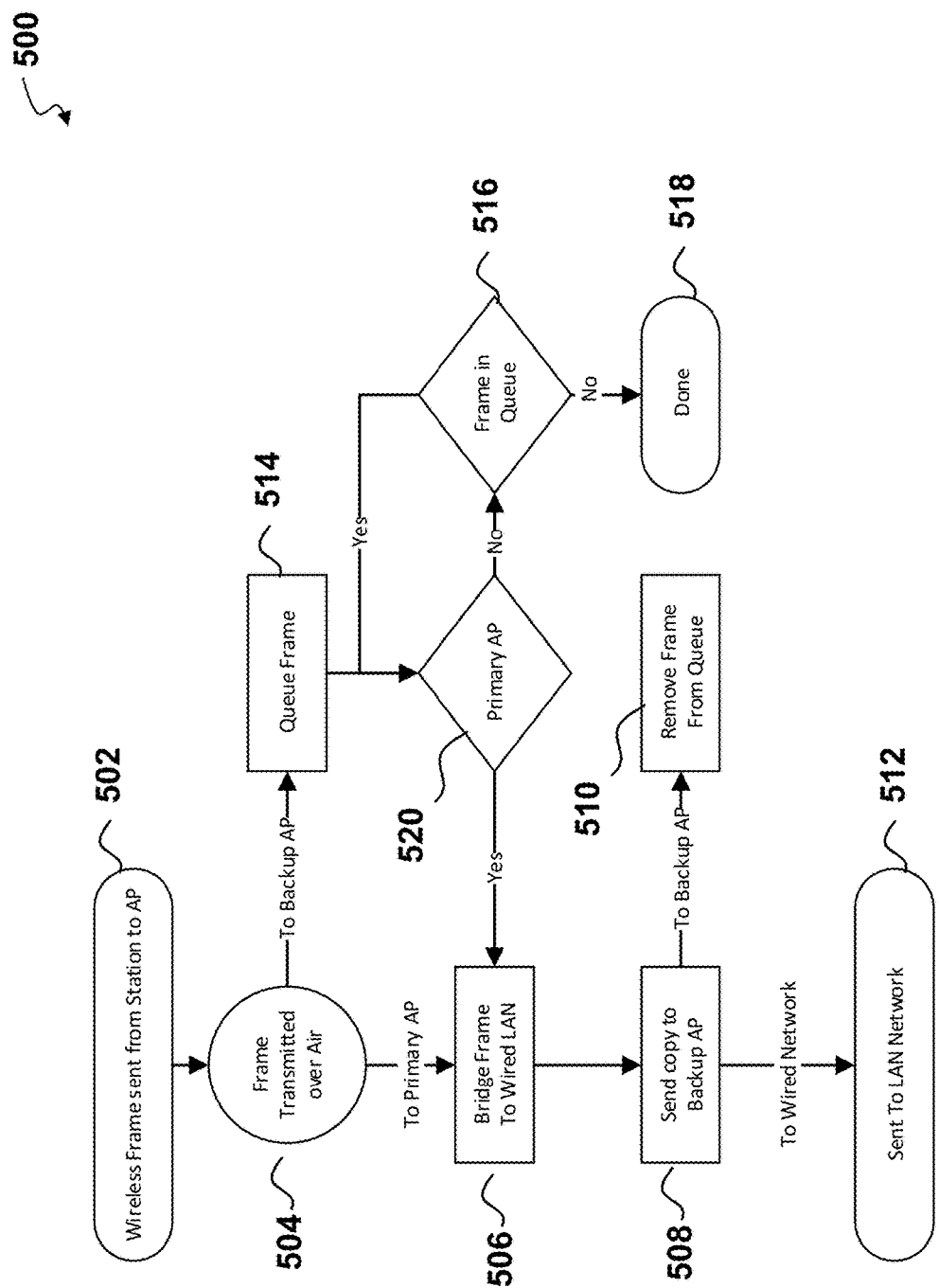
FIG. 11 a flowchart of a flow of data associated with the system of FIGS. 2 and 8.

With respect to FIG. 11, a flowchart 500 of the flow of data for Option 2 of FIG. 8 is illustrated. At step 502, a wireless frame is sent to an access point, such as access point 102a,b from a station. At step 504, the frame is sent over the air and may be received simultaneously in both a primary access point at step 506 as well as a backup access point at step 514. At step 514, the frame will be introduced in the backup access point, such as 102b, and will be stored in the backup access point's 102b memory. At the same time, at step 506, the frame is received in the first, primary access point, such as access point 102a, and the frame is bridged to a wired LAN. At step 508, a copy of the frame will be sent to the backup access point over the hot sync cable 112. The frame will then continue to the wired network. At step 512 the frame is sent to the LAN network. At step 510, a copy of the frame is received in the backup, secondary access point, such as access point 102b, and the matching frame that was stored at step 514 is removed from the queue.

After step 514, the backup, secondary access point 102b, will check if it has become a primary access point due to failure detection at original primary access point 102a, at step 520. If the access point 102b has become the primary access point, then the access point 102b will bridge the frame and continue in pervious described data flow, at step 506. If the access point 102b has not become the primary access point, the backup access point 102b will continue checking if there are pending frames in the memory (step 516) and go return to step 520 if a pending frame exists. If no frames are waiting in the memory, then the backup process will be completed until the next wireless frame is sent (step 518).

Figure 12:
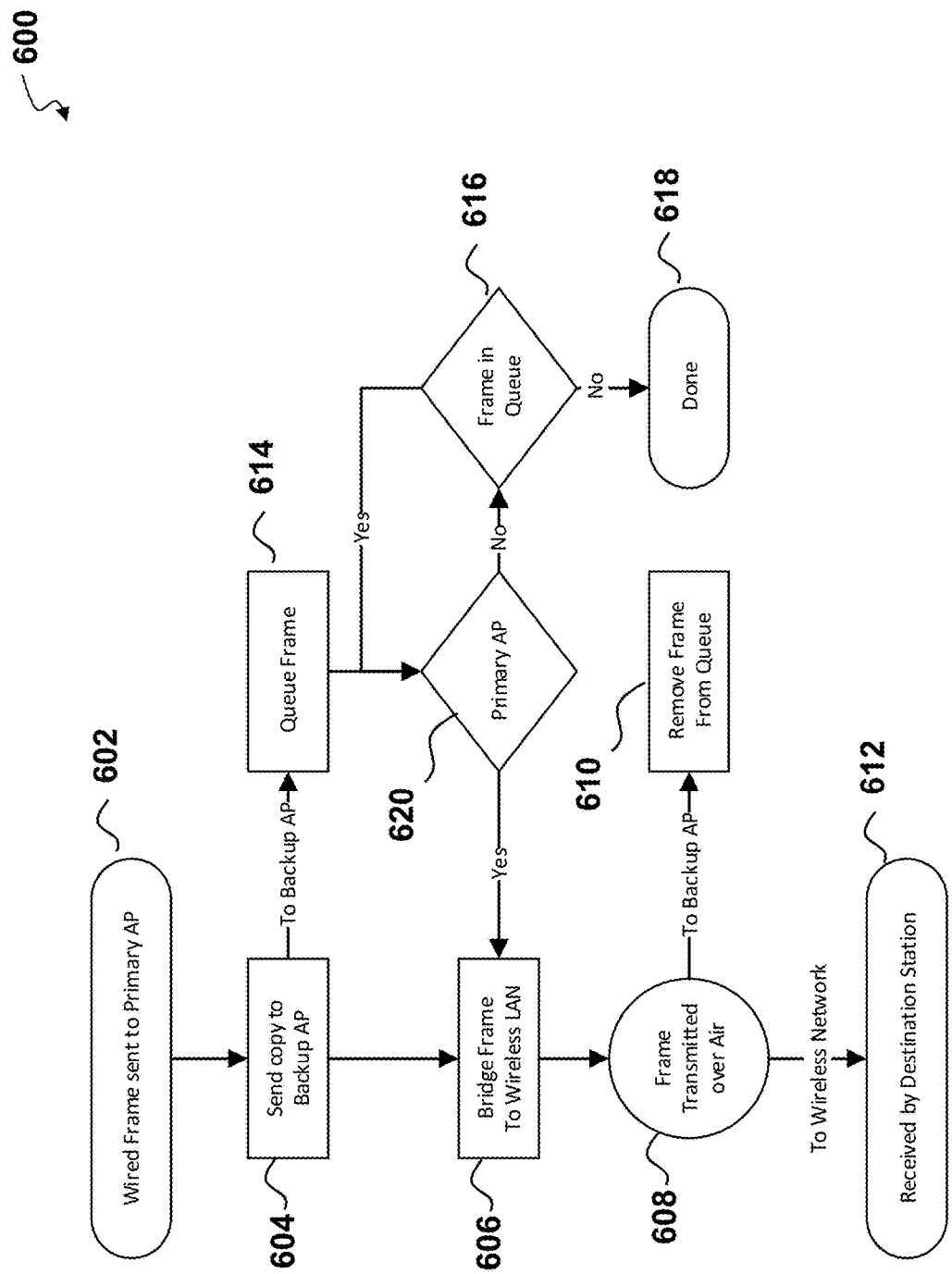
FIG. 12 a flowchart of an alternative flow of data associated with the system of FIGS. 2 and 8.

With respect to FIG. 12, a flowchart 600 of the flow of data for Option 2 of FIG. 8 is illustrated. At step 602, a wired frame is sent to a primary access point, such as access point 102a. At step 604, a copy of the frame will be sent to a backup access point, such as backup access point 102b over a hot sync cable, such as hot sync cable 112. The copy of the frame will then be queued in the backup access point's 102b memory (step 614). At the same time, at step 606, the original frame is bridged to wireless LAN. At step 608, the frame is transmitted over air and may be received simultaneously in both the backup access point 102b at step 610 as well as a destination station at step 612. If the frame is received in the backup, secondary access point, such as access point 102b, then the matching frame that was queued in step 614 is removed from the queue (step 610). At the same time, the same frame is be received at the destination wireless stations, at step 612.

After step 614, the backup, secondary access point 102b, will check if it has become a primary access point due to failure detection at original primary access point 102a, at step 620. If the access point 102b has become the primary access point, then the access point 102b will bridge the frame in step 606 and continue in previously described data flow. If the access point 102b has not become the primary access point, the backup access point 102b will continue checking if there are pending frames in the memory (step 616) and return to step 620 if a pending frame exist. If no frames are waiting in the memory, then the backup process will be completed until the next wired frame is sent (step 618).

Figure 13:
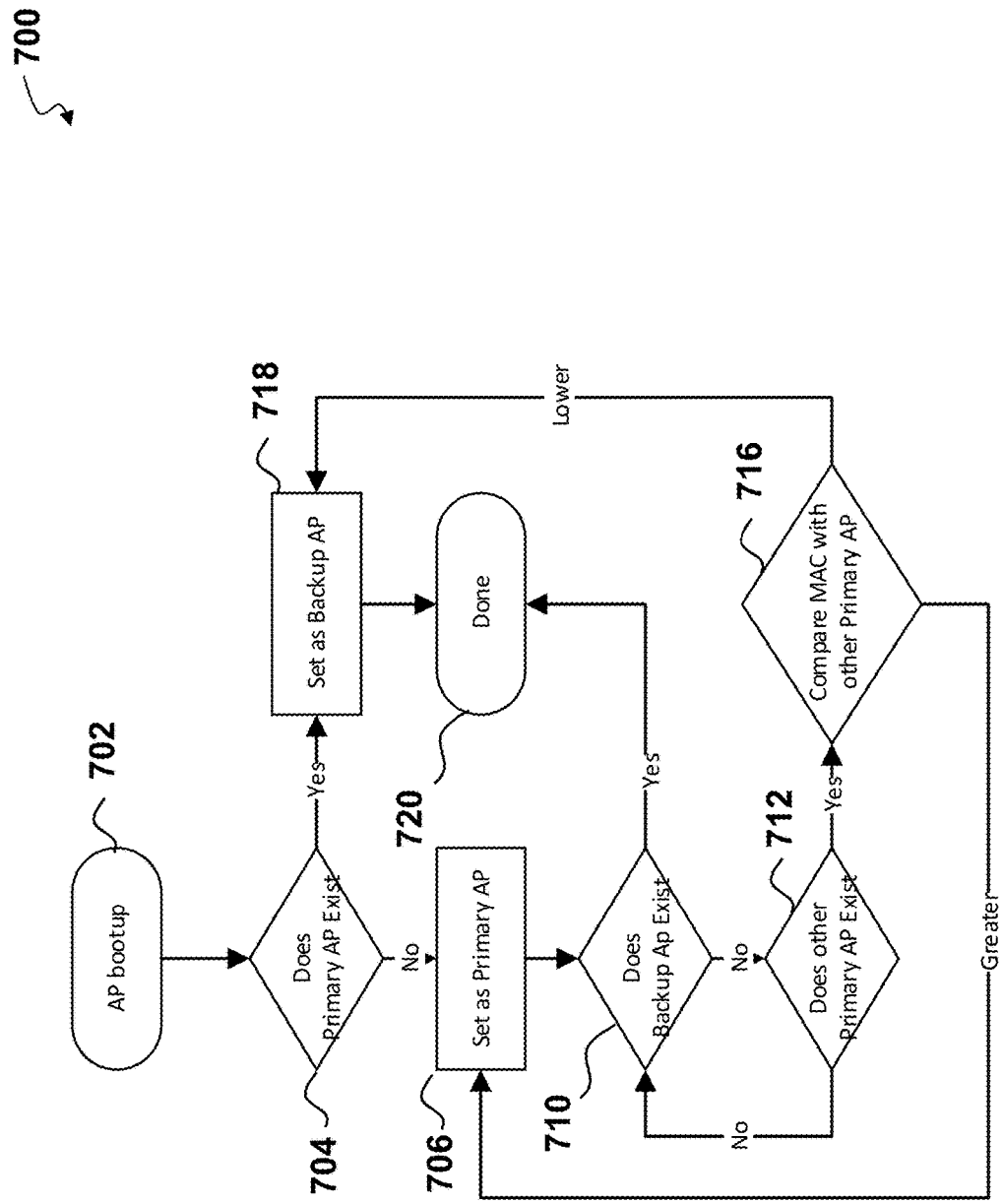
FIG. 13 a flowchart of the initial role selection for a system for single-channel architecture for immediate access point redundancy.

With respect to FIG. 13, a flowchart 700 of the initial role selection for SCA redundancy is illustrated. At step 702, an access point, such as access point 102a or access point 102b is booted up. At step 704, it is determined if a primary access point already exists. In one embodiment, the processor 324 may executes steps to run the application 322 to determine if the primary access point already exists. If a primary access point does not exist, then the access point is selected to be the primary access point at step 706. At step 710, it is determined if a backup access point already exists. If a backup access point already exists, then the initial role selection is competed at step 720. If a backup access point does not already exists, then it is determined if another primary access point already exists at step 712. If another primary access point does not already exist, then the process returns to step 710. If another primary access point does already exist, then at step 716, the media access control (MAC) address is compared to the MAC address of the other primary access point. If the MAC address is lower than the other primary access point, then the access point is set to be the backup access point at step 718, and the process is completed at step 720. For example, MAC addresses are in hexadecimal format ranging from 0-9 and a-f, and the comparison may involve the lower value of the sequence of values from 0-9, the values a-f, or a combination of the two in a MAC address. If the MAC is greater than the primary access point, then the process returns to step 706 and the access point is set as the primary access point.

Figure 14:
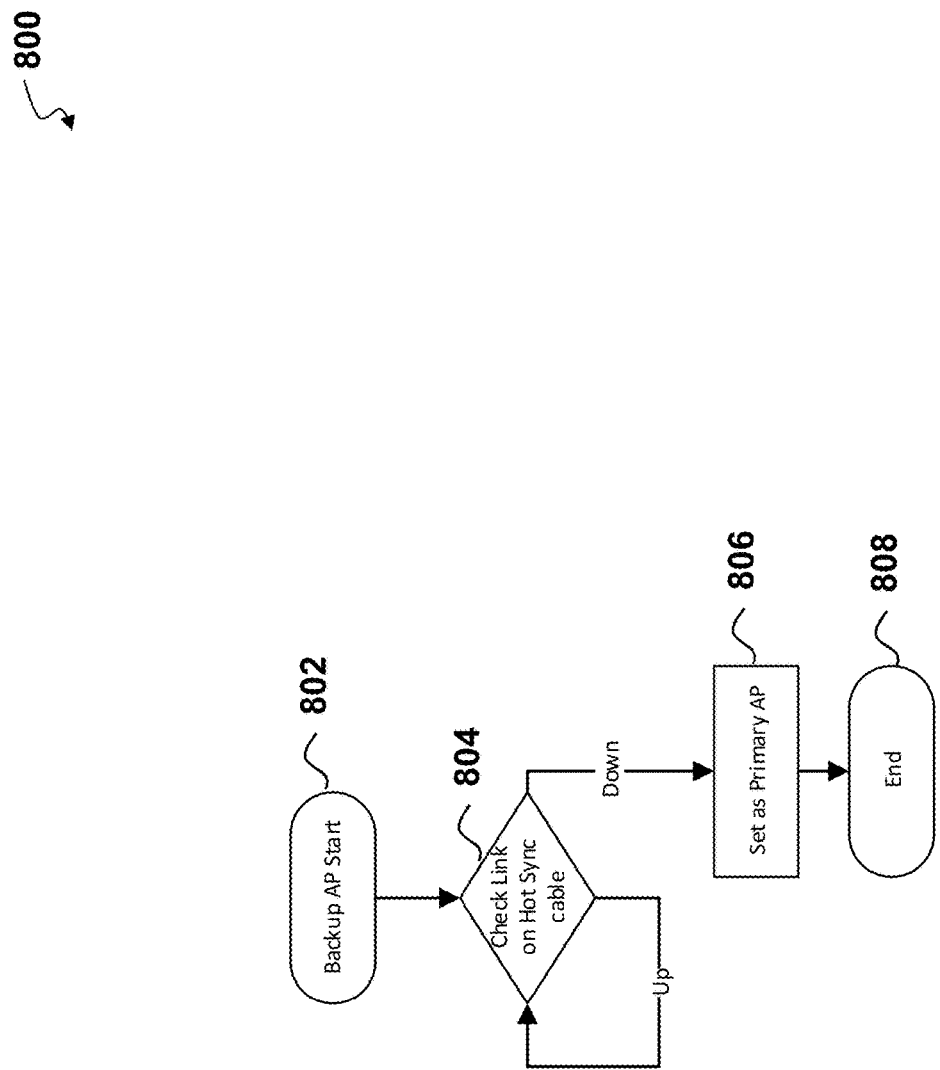
FIG. 14 a flowchart of a process for detecting a malfunction or failure associated with a primary access point by a backup access point.

With respect to FIG. 14, a flowchart 800 of a process for detecting a malfunction or failure associated with a primary access point by a backup access point is shown. At step 802, a backup access point is started. At step 804, and in one embodiment, a link detected over a physical layer connected to a hot sync cable is checked to be up and running or down. If the link of hot sync cable is up and running, then the process is repeated at step 804. If the link of hot sync cable is down, then the backup access point is set as the primary access point at step 806. At step 808, the process of access point malfunction/failure is completed.

Figure 15:
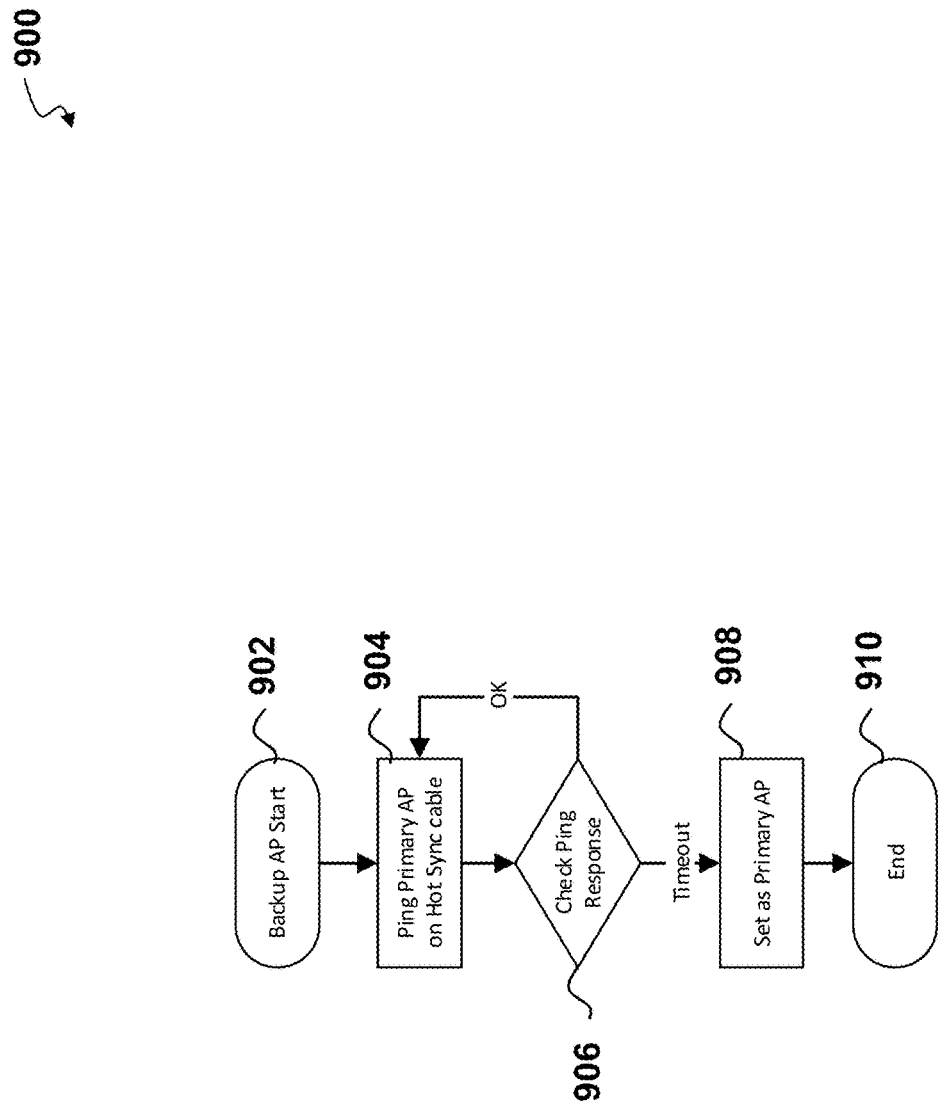
FIG. 15 a flowchart of an alternative process for detecting a malfunction or failure associated with a primary access point by a backup access point.

With respect to FIG. 15, a flowchart 900 of a process for detecting a malfunction or failure associated with a primary access point by a backup access point is shown. At step 902, a backup access point is started. At step 904, a primary access point is pinged over a hot sync cable. More specifically, a frame is generated and sent over a hot sync cable, such as hot sync cable 112. In response to the frame being received in the primary access point, a response frame will be generated and sent back over the hot sync cable to the backup access point. At step 906, a response to the ping sent over the hot sync cable to the primary access point is check. If the primary access point is up and running (e.g., the response is "OK" and was received within an expected time window), then the process returns to step 904. If no response is received (e.g., a lack of a response within an expected time window), then the backup access point is set as the primary access point at step 908. At step 910, the process of access point malfunction/failure is completed.

Figure 16:
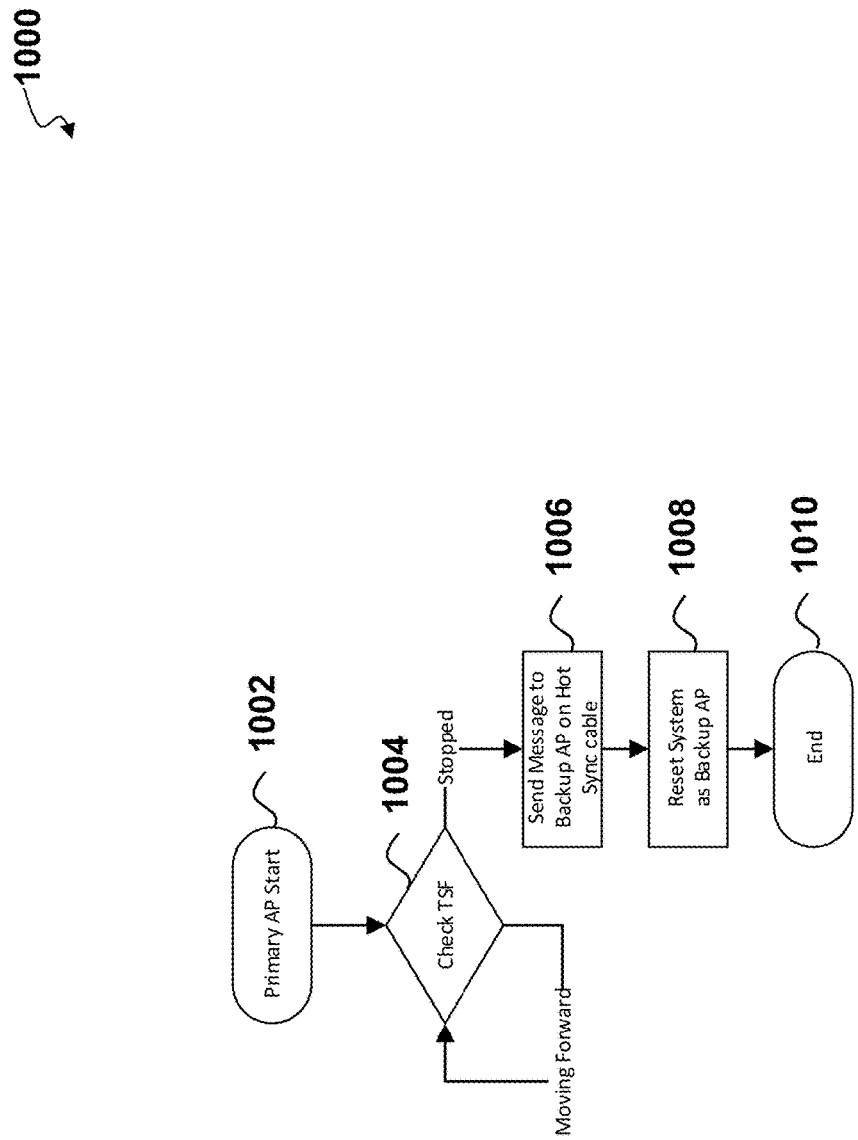
FIG. 16 a flowchart of a process for detecting a malfunction or failure associated with a primary access point.

With respect to FIG. 16, a flowchart 1000 of a process for detecting a malfunction or failure associated with a primary access point is shown. At step 1002, a primary access point is started. At step 1004, a timing synchronization function (TSF) is checked. If the TSF is moving forward, then the process returns to step 1004. If the TSF has stopped, then a message is sent to the backup access point at step 1006. At step 1008, the primary access point is then reset to be the backup access point, and at step 1010 the process of access point malfunction/failure is completed.

Figure 17:
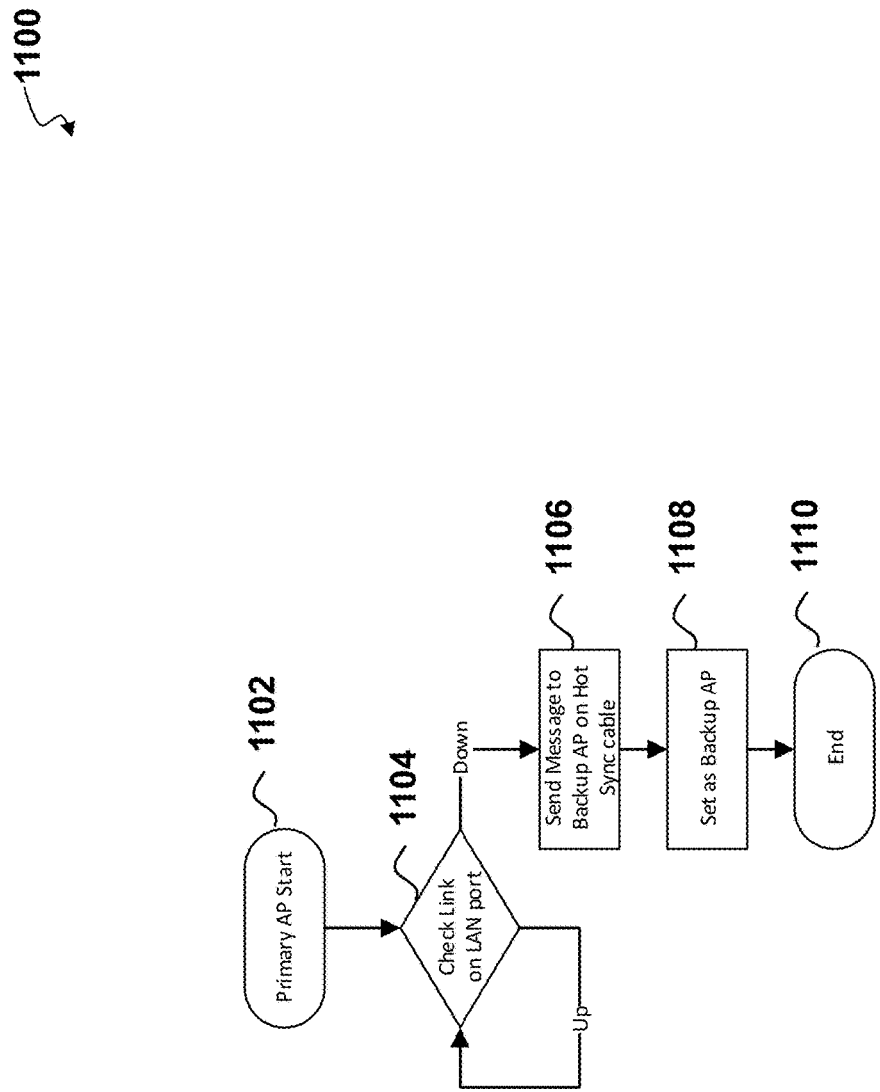
FIG. 17 a flowchart of an alternative process for detecting a malfunction or failure associated with a primary access point.

With respect to FIG. 17, a flowchart 1100 of a process for detecting a malfunction or failure associated with a primary access point is shown. At step 1102, a primary access point is started. At step 1104, a physical layer link on a LAN port is checked to be up and running or down. If the link on the LAN port is up and running, then the process is repeated at step 1104. If the link on the LAN port is down, then a message is sent to the backup access point on a hot sync cable at step 1106. At step 1108, the primary access point is then reset to be the backup access point, and at step 1110 the process of access point malfunction/failure is completed.

Flowcharts 800, 900, 1000, 1100 describe methods to detect failure in a primary access point. Upon detection of a failure in the primary access point, a backup access point is immediately reactivated as the new, primary access point. Due to the nature of a single-channel architecture (SCA) network, where all access points may have the same wireless configurations, the transition from backup access point to primary access point will be seamless to any connected station which will remain connected to the network through the new primary access point. In one embodiment, the malfunctioning access point will try to restart itself and come up as the backup access point according to flowchart 700.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
two or more access points (APs), wherein each AP comprises:
at least one LAN port configured to connect to a network including a wired network;
at least one LAN port configured to connect between at least one other AP;
a processor having addressable memory, wherein the processor of a first AP of the two or more APs is configured to communicate with the processor of a second AP of the two or more APs over a hot sync cable, and wherein the processors of the APs are configured to:
select the first AP of the two or more APs as a primary AP;
select the second AP of the two or more APs as a back-up AP;
detect, via a trigger, a failure of the primary AP, wherein the connection to a local network is via an Ethernet cable, and wherein the detected failure of the primary AP comprises a failure of the Ethernet cable between the primary AP and the backup AP; and
configure the second AP as the primary AP and the first AP as the back-up AP if the failure of the first AP is detected.

2. The system of claim 1, wherein the two or more APs are configured to tune to the same radio frequency (RF) channel or frequency.

3. The system of claim 1, wherein each of the two or more APs are configured to provide wireless connections to one or more user devices.

4. The system of claim 1, wherein the at least one LAN port configured to connect between at least one other AP is a general-purpose input/output (GPIO) port.

5. The system of claim 1, wherein the back-up AP is configured to receive frames, and wherein the back-up AP is configured to not transmit frames.

6. The system of claim 1, wherein the connection between the APs is via the hot sync cable.

7. The system of claim 6, wherein the hot sync cable is an Ethernet cable.

8. The system of claim 1, wherein the connection between the APs is wireless.

9. The system of claim 1 further comprising:
a hub configured to be in communication with each of the two or more APs via each of the at least one LAN ports for Ethernet connection to the local network, wherein the hub is configured to be directly connected to the local network.

10. A system comprising:
two or more access points (APs), wherein each AP comprises:
at least one LAN port configured to connect to a hub;
at least one LAN port configured to connect between at least one other AP;
a processor having addressable memory, wherein the processor of a first AP of the two or more APs is configured to communicate with the processor of a second AP of the two or more APs over a hot sync cable, and wherein the processors of the APs are configured to:
select the first AP of the two or more APs as a primary AP;
select the second AP of the two or more APs as a back-up AP;

detect, via a trigger, a failure of the primary AP; and
configure the second AP as the primary AP and the first AP as the back-up AP if the failure of the first AP is detected;
wherein the hub is configured to be in communication with each of the two or more APs via each of the at least one LAN ports, wherein the hub is directly connected to the local network, and wherein the hub is configured to be directly connected to the local network via a single cable.

11. A system comprising:

a first access point (AP) of two or more access points (APs), wherein the first AP comprises:
  at least one LAN port configured to connect to a local network;
  at least one LAN port configure to connect between at least one other AP via a hot sync cable;
  a processor having addressable memory, the processor configured to:
    select the first AP of the two or more APs as a primary AP;
    detect a failure of the first AP;
    send a signal via the hot sync cable based on the detected failure;
    configure the first AP of the two or more APs as a back-up AP;

a second (AP) of two or more access points (APs), wherein the second AP comprises:
  at least one LAN port configured to connect to the local network;
  at least one LAN port configured to connect between at least one other AP via the hot sync cable;
  a processor having addressable memory, the processor configured to:
    select the second AP of the two or more APs as a back-up AP;
    receive a signal from the first AP based on the detected failure;
    configure the second AP of the two or more APs as a primary AP;

a hub configured to communicate with each of the two or more APs via each of the at least one LAN ports for Ethernet connection to the local network, wherein the hub is directly connected to the local network, and wherein the hub is directly connected to the local network via a single cable.

12. The system of claim 11, wherein the back-up AP is configured to receive frames, and wherein the back-up AP is configured to not transmit frames.

* * * * *